(12) United States Patent
Davidson

(10) Patent No.: US 8,723,698 B2
(45) Date of Patent: May 13, 2014

(54) OVERLAPPING GEOGRAPHIC AREAS

(75) Inventor: Mark J. Davidson, Alpharetta, GA (US)

(73) Assignee: United Parcel Service of America, Inc.

( * ) Notice: Subject to any disclaimer, the term of this patent is extended or adjusted under 35 U.S.C. 154(b) by 0 days.

(21) Appl. No.: 13/465,563

(22) Filed: May 7, 2012

(65) Prior Publication Data
US 2013/0281133 A1 Oct. 24, 2013

Related U.S. Application Data

(60) Provisional application No. 61/635,423, filed on Apr. 19, 2012.

(51) Int. Cl.
*G08G 1/123* (2006.01)
*G05D 1/00* (2006.01)

(52) U.S. Cl.
USPC ........... 340/991; 340/992; 340/995.25; 701/2

(58) Field of Classification Search
USPC .......... 340/933, 992, 995.14, 995.18, 995.19, 340/995.24, 991, 995.25; 700/240; 701/2, 701/24, 118, 422; 702/3
See application file for complete search history.

(56) References Cited

U.S. PATENT DOCUMENTS

| | | | |
|---|---|---|---|
| 6,246,932 B1 * | 6/2001 | Kageyama et al. | 701/24 |
| 6,681,157 B2 * | 1/2004 | Kageyama | 701/1 |
| 7,643,936 B1 | 1/2010 | Boxberger et al. | |
| 2011/0238300 A1 * | 9/2011 | Schenken | 701/207 |
| 2012/0271489 A1 * | 10/2012 | Roberts et al. | 701/2 |
| 2012/0310536 A1 * | 12/2012 | Katayama et al. | 702/3 |

OTHER PUBLICATIONS

International Searching Authority, International Search Report and Written Opinion for International Application No. PCT/US2012/060192, mailed Mar. 15, 2013, 9 pages, European Patent Office, The Netherlands.

* cited by examiner

*Primary Examiner* — Van T. Trieu
(74) *Attorney, Agent, or Firm* — Alston & Bird LLP

(57) ABSTRACT

Systems, methods, apparatus, and computer program products are provided for identifying overlapping areas. For example, in one embodiment, telematics data can be collected as vehicles traverse various geographic areas. Then, the areas traversed by the vehicles can be displayed to identify overlapping areas.

24 Claims, 10 Drawing Sheets

OVERLAPPING GEOGRAPHIC AREAS

CROSS-REFERENCE TO RELATED APPLICATIONS

This application claims priority to U.S. Provisional Application No. 61/635,423, filed Apr. 19, 2012, which is hereby incorporated herein in its entirety by reference.

BACKGROUND

Operating a fleet of vehicles, such as a fleet of pickup/delivery vehicles, can present many challenges. For example, fleet operators typically try to minimize the distances traversed by their vehicles. By minimizing the distances traversed, fleet operators can reduce fuel costs and increase driver efficiency. Thus, a need exists to ensure that multiple vehicles in a fleet are not traversing the same geographic areas, such as visiting locations on the same street or in the same neighborhood.

BRIEF SUMMARY

In general, embodiments of the present invention provide systems, methods, apparatus, and computer program products for identifying overlapping areas.

In accordance with one aspect, a method for identifying an overlapping area is provided. In one embodiment, the method comprises receiving telematics data associated with a first vehicle, wherein the telematics data is collected while the first vehicle operates within a first geographic area; receiving telematics data associated with a second vehicle, wherein the telematics data is collected while the second vehicle operates within a second geographic area; and identifying an overlapping area, wherein (1) the overlapping area is identified based at least in part from the (a) telematics data associated with the first vehicle and (b) the telematics data associated with the second vehicle, and (2) at least a portion of the overlapping area is within the first geographic area and the second geographic area.

In accordance with yet another aspect, a computer program product for identifying an overlapping area is provided. The computer program product may comprise at least one computer-readable storage medium having computer-readable program code portions stored therein, the computer-readable program code portions comprising executable portions configured to receive telematics data associated with a first vehicle, wherein the telematics data is collected while the first vehicle operates within a first geographic area; receive telematics data associated with a second vehicle, wherein the telematics data is collected while the second vehicle operates within a second geographic area; and identify an overlapping area, wherein (1) the overlapping area is identified based at least in part from the (a) telematics data associated with the first vehicle and (b) the telematics data associated with the second vehicle, and (2) at least a portion of the overlapping area is within the first geographic area and the second geographic area.

In accordance with yet another aspect, an apparatus comprising at least one processor and at least one memory including computer program code is provided. In one embodiment, the at least one memory and the computer program code may be configured to, with the processor, cause the apparatus to at least receive telematics data associated with a first vehicle, wherein the telematics data is collected while the first vehicle operates within a first geographic area; receive telematics data associated with a second vehicle, wherein the telematics data is collected while the second vehicle operates within a second geographic area; and identify an overlapping area, wherein (1) the overlapping area is identified based at least in part from the (a) telematics data associated with the first vehicle and (b) the telematics data associated with the second vehicle, and (2) at least a portion of the overlapping area is within the first geographic area and the second geographic area.

BRIEF DESCRIPTION OF THE SEVERAL VIEWS OF THE DRAWING(S)

Reference will be made to the accompanying drawings, which are not necessarily drawn to scale, and wherein:

FIG. 1 is a diagram of a system that can be used to practice various embodiments of the present invention.

FIG. 2 includes a diagram of a data collection device that may be used in association with certain embodiments of the present invention.

DETAILED DESCRIPTION

Figure 1:
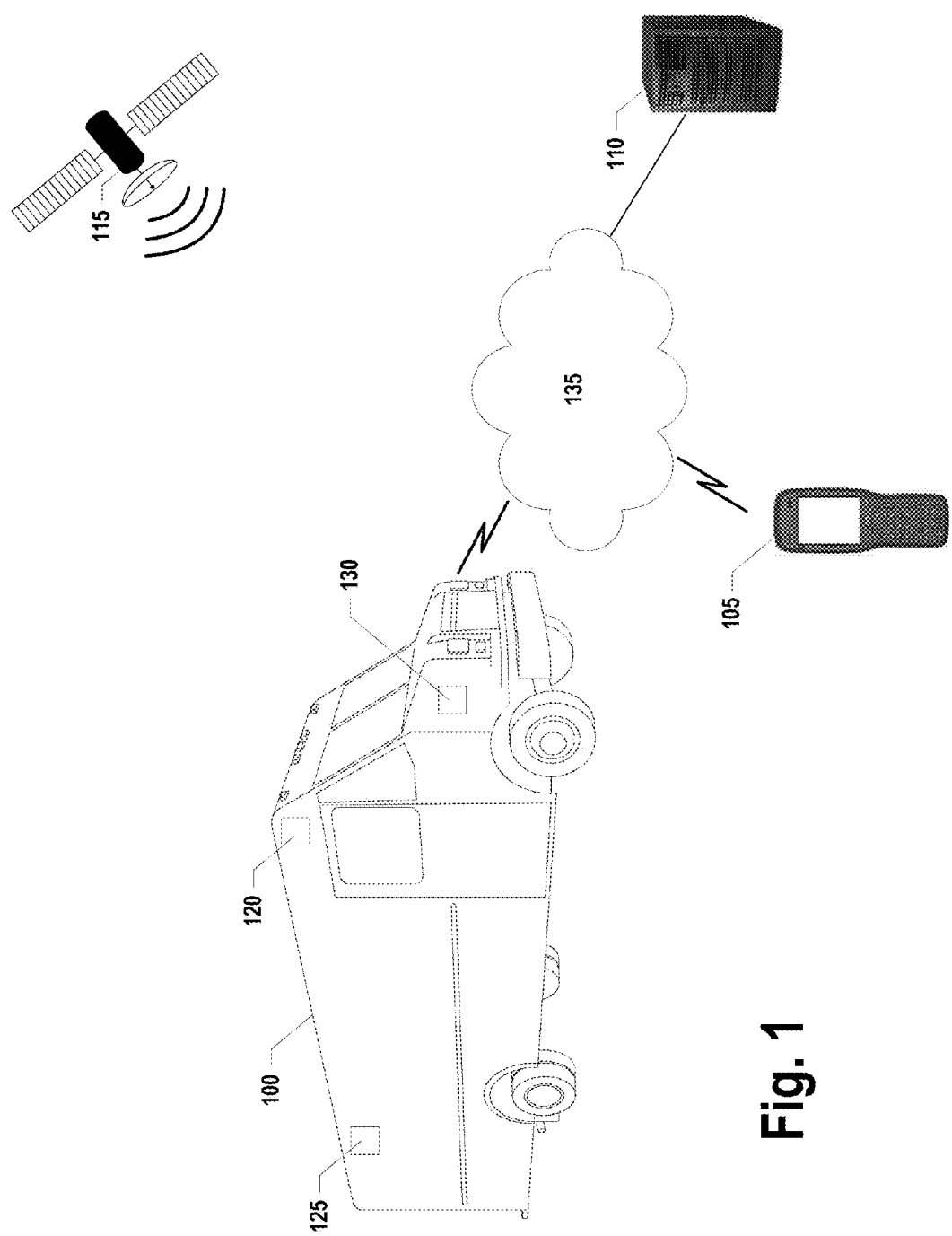

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more vehicles 100, one or more portable devices 105, one or more servers 110, one or more Global Positioning System (GPS) satellites 115, one or more location sensors 120, one or more vehicle sensors 125, one or more data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, a vehicle 100 may include one or more location sensors 120, one or more vehicle sensors 125, one or more data collection devices 130, and/or the like.

Figure 2:
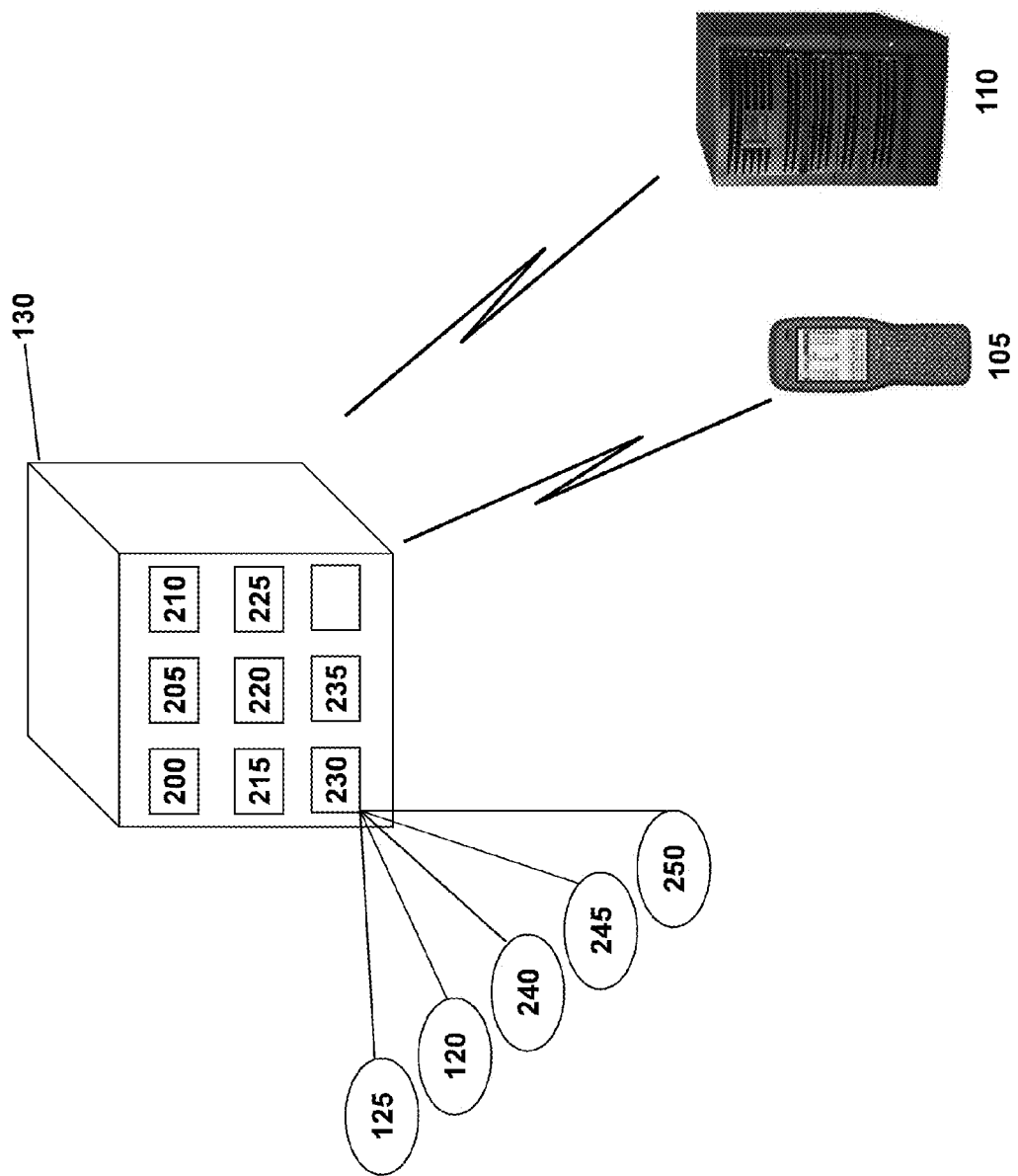

Reference is now made to FIG. 2, which provides a block diagram of an exemplary data collection device 130. In one embodiment, the data collection device 130 may include, be associated with, or be in communication with one or more power sources 220, one or more real-time clocks 215, one or more processors 200, one or more memory modules 210 (e.g., removable and/or non-removable memory, volatile and/or non-volatile memory, and transitory and/or non-transitory memory), one or more databases (not shown), one or more programmable logic controllers (PLC) 225, a J-Bus protocol architecture, and one or more electronic control modules (ECM) 245. For example, the ECM 245, which may be a scalable and subservient device to the data collection device 130, may have data processing capability to decode and store analog and digital inputs from vehicle systems and sensors. The ECM 245 may further have data processing capability to collect and provide telematics data to the J-Bus (which may allow transmission to the data collection device 130), and output standard vehicle diagnostic codes when received from a vehicle's J-Bus-compatible on-board controllers 240 and/or sensors.

In one embodiment, the data collection device 130 may include, be associated with, or be in communication with one or more radio frequency identification (RFID) tags 250. In one embodiment, the one or more RFID tags 250 may include active RFID tags, each of which may comprise at least one of the following: (1) an internal clock; (2) a memory; (3) a microprocessor; and (4) at least one input interface for connecting with sensors located in the vehicle 100 and/or the data collection device 130. In another embodiment, the RFID tags 250 may be passive RFID tags.

In one embodiment, the data collection device 130 may include, be associated with, or be in communication with one or more location-determining devices and/or one or more location sensors 120 (e.g., Global Navigation Satellite System (GNSS) sensors). The one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's driver and with various communication points (e.g., cellular towers or Wi-Fi access points) positioned at various locations throughout a geographic area to monitor the location of the vehicle 100 and/or its driver. The one or more location sensors 120 may be used to receive latitude, longitude, altitude, geocode, course, position, time, and/or speed data (e.g., telematics data). The one or more location sensors 120 may also communicate with the server 110, the data collection device 130, and/or a similar network entity.

In one embodiment, the data collection device 130 may include, be associated with, or be in communication with one or more vehicle sensors 125. In one embodiment, the vehicle sensors 125 may include vehicle sensors, such as engine, fuel, odometer, hubometer, tire pressure, location, weight, emissions, door, and speed sensors. Thus, the one or more vehicle sensors 125 may collect speed data, emissions data, RPM data, tire pressure data, oil pressure data, seat belt usage data, distance data, fuel data, and/or idle data (e.g., telematics data). The vehicle sensors 125 may also include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data and/or meteorological data.

In one embodiment, the data collection device 130 may include, be associated with, or be in communication with one or more communication ports 230 for receiving data from various sensors (e.g., via a CAN-bus), one or more communication ports 205 for transmitting data, and one or more data radios 235 for communication with a variety of communication networks. Embodiments of the communication port 230 may include an Infrared Data Association (IrDA) communication port, a data radio, and/or a serial port. The communication port 230 may receive instructions for the data collection device 130. These instructions may be specific to the vehicle 100 in which the data collection device 130 is installed, specific to the geographical area in which the vehicle 100 will be operated, and/or specific to the function the vehicle 100 serves within the fleet. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via these communication standards and protocols, the data collection device 130 can communicate with various other entities, such as the portable device 105 and/or the server 110. As will be recognized, the data collection device 130 may transmit the telematics data to the portable device 105 and/or the server 110 via one of several communication methods.

b. Exemplary Server

Figure 3:
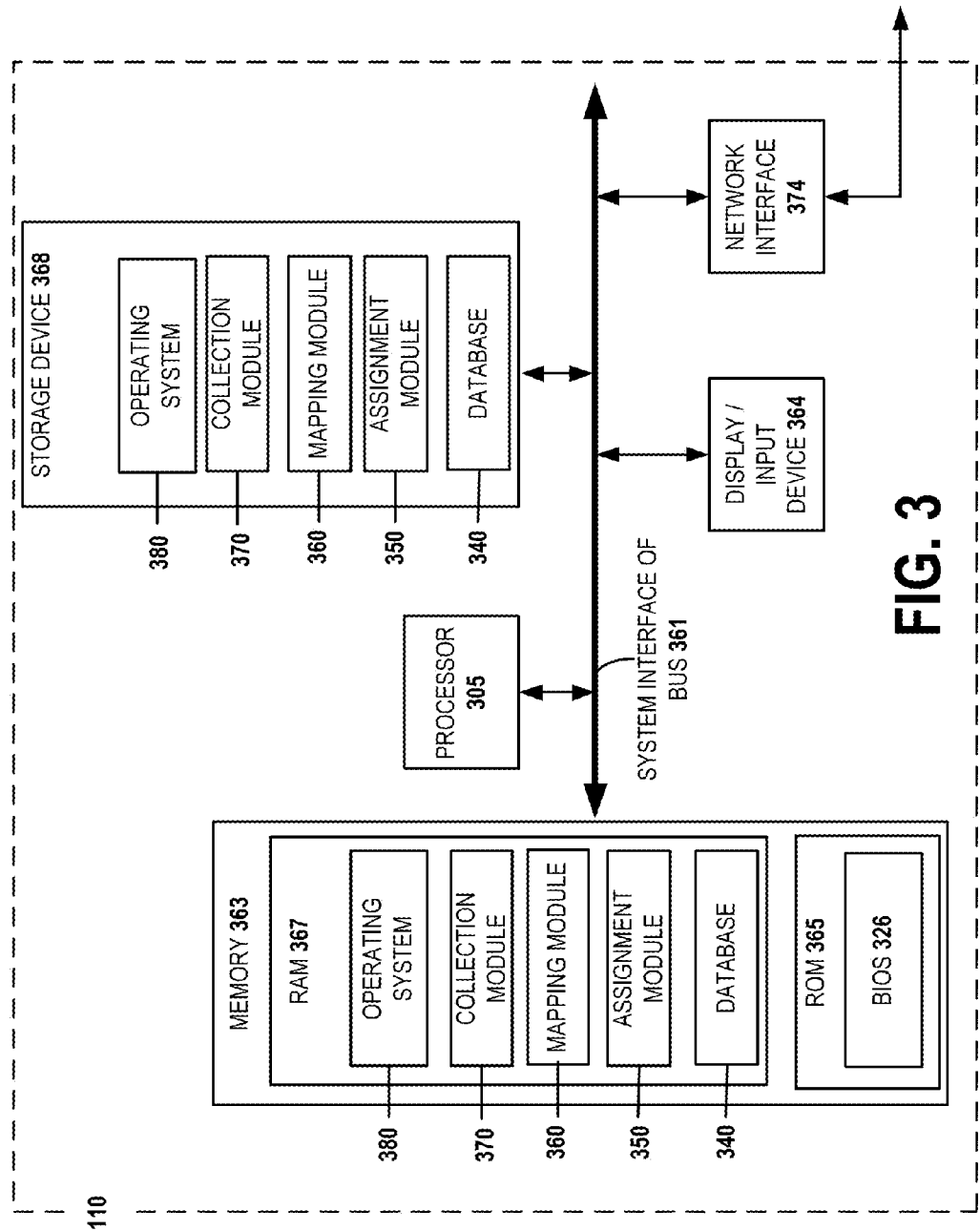
FIG. 3 is a schematic of a server in accordance with certain embodiments of the present invention.

FIG. 3 provides a schematic of a server 110 according to one embodiment of the present invention. In general, the term "server" may refer to, for example, any computer, computing device, mobile phone, desktop, notebook or laptop, distributed system, server, blade, gateway, switch, distributed system, processing device, or combination of processing devices adapted to perform the functions described herein. As will be understood from this figure, in one embodiment, the server 110 may include a processor 305 that communicates with other elements within the server 110 via a system interface or bus 361. The processor 305 may be embodied in a number of different ways. For example, the processor 305 may be embodied as one or more processing elements, one or more microprocessors with accompanying digital signal processors, one or more processors without an accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention when configured accordingly. A display device/input device 364 for receiving and displaying data may also be included in or associated with the server 110. The display device/input device 364 may be, for example, a keyboard or pointing device that is used in combination with a monitor. The server 110 may further include transitory and non-transitory memory 363, which may include both random access memory (RAM) 367 and read only memory (ROM) 365. The server's ROM 365 may be used to store a basic input/output system (BIOS) 326 containing the basic routines that help to transfer information to the different elements within the server 110.

In addition, in one embodiment, the server 110 may include at least one storage device 368, such as a hard disk drive, a CD drive, a DVD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 368 may be connected to the system bus 361 by an appropriate interface.

Furthermore, a number of program modules may be stored by the various storage devices 368 and/or within RAM 367. Such program modules may include an operating system 380, a collection module 370, a mapping module 360, and an assignment module 350. As discussed in greater detail below, these modules may control certain aspects of the operation of the server 110 with the assistance of the processor 305 and operating system 380—although their functionality need not be modularized. In addition to the program modules, the server 110 may store and/or be in communication with one or more databases, such as database 340.

Also located within and/or associated with the server 110, in one embodiment, is a network interface 374 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the server 110 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the server's 110 components may be located remotely from other server 110 components. Furthermore, one or more of the components may be combined and additional components performing functions described herein may be included in the server 110.

c. Exemplary Portable Device

Figure 4:
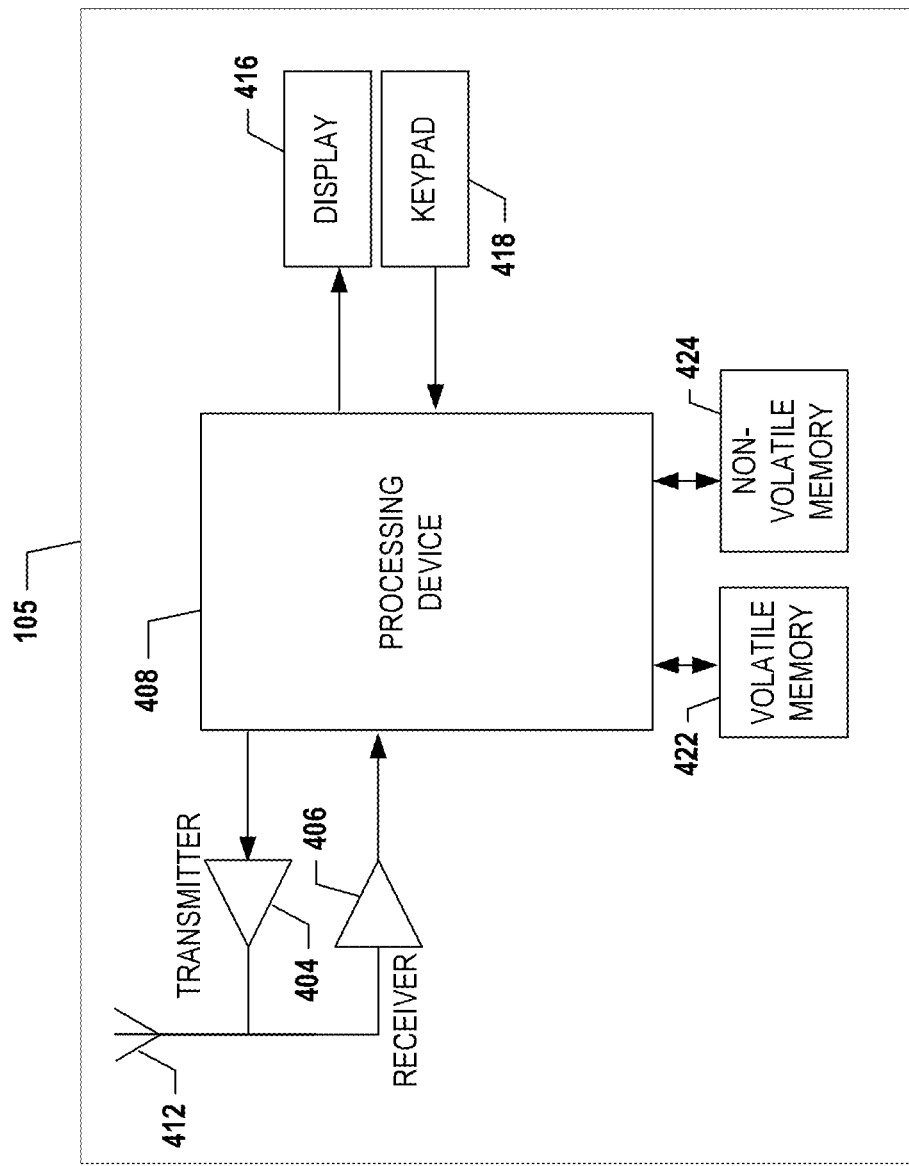
FIG. 4 is a schematic of a portable device in accordance with certain embodiments of the present invention.

With respect to the portable device 105, FIG. 4 provides an illustrative schematic representative of a portable device 105 that can be used in conjunction with the embodiments of the present invention (e.g., a portable device 105 may be used a driver of each vehicle 100). As shown in FIG. 4, the portable device 105 can include an antenna 412, a transmitter 404, a receiver 406, and a processing device 408, e.g., a processor, controller, and/or the like, that provides signals to and receives signals from the transmitter 404 and receiver 406, respectively.

The signals provided to and received from the transmitter 404 and the receiver 406, respectively, may include signaling information in accordance with an air interface standard of applicable wireless (or wired) systems. In this regard, the portable device 105 may be capable of operating with one or more air interface standards, communication protocols, modulation types, and access types. More particularly, the portable device 105 may operate in accordance with any of a number of second-generation (2G) communication protocols, third-generation (3G) communication protocols, and/or the like. Further, for example, the portable device 105 may operate in accordance with any of a number of different wireless networking techniques, such as GPRS, UMTS, CDMA2000, WCDMA, TD-SCDMA, LTE, E-UTRAN, Wi-Fi, WiMAX, UWB, and/or any other wireless protocol. Via these communication standards and protocols, the portable device 105 can communicate with the server 110 and/or various other entities.

The portable device 105 may also comprise a user interface (that can include a display 416 coupled to a processing device 408) and/or a user input interface (coupled to the processing device 408). The user input interface can comprise any of a number of devices allowing the portable device 105 to receive data, such as a keypad 418, a touch display (not shown), barcode reader (not shown), RFID tag reader (not shown), and/or other input device. In one embodiments including a keypad 418, the keypad 418 can include the conventional numeric (0-9) and related keys (#, *), and other keys used for operating the portable device 105 and may include a full set of alphabetic keys or set of keys that may be activated to provide a full set of alphanumeric keys. In addition to providing input, the user input interface can be used, for example, to activate and/or deactivate certain functions, such as screen savers and/or sleep modes. Although not shown, the portable device 105 may also include a battery, such as a vibrating battery pack, for powering the various circuits that are required to operate the portable device 105, as well as optionally providing mechanical vibration as a detectable output.

The portable device 105 can also include volatile memory 422 and/or non-volatile memory 424, which can be embedded or may be removable. For example, the non-volatile memory may be embedded or removable MMCs, SD memory cards, Memory Sticks, EEPROM, flash memory, hard disk, and/or the like. The memory can store any of a number of pieces or amount of information and data used by the portable device 105 to implement the functions of the portable device 105. The memory can also store content, such as computer program code for an application and/or other computer programs.

The portable device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites. In addition, data regarding, for example, heading and estimated time of arrival (ETA) can also be captured, which enhances the determination of the position of the GPS module.

III. Exemplary System Operation

Figure 5:
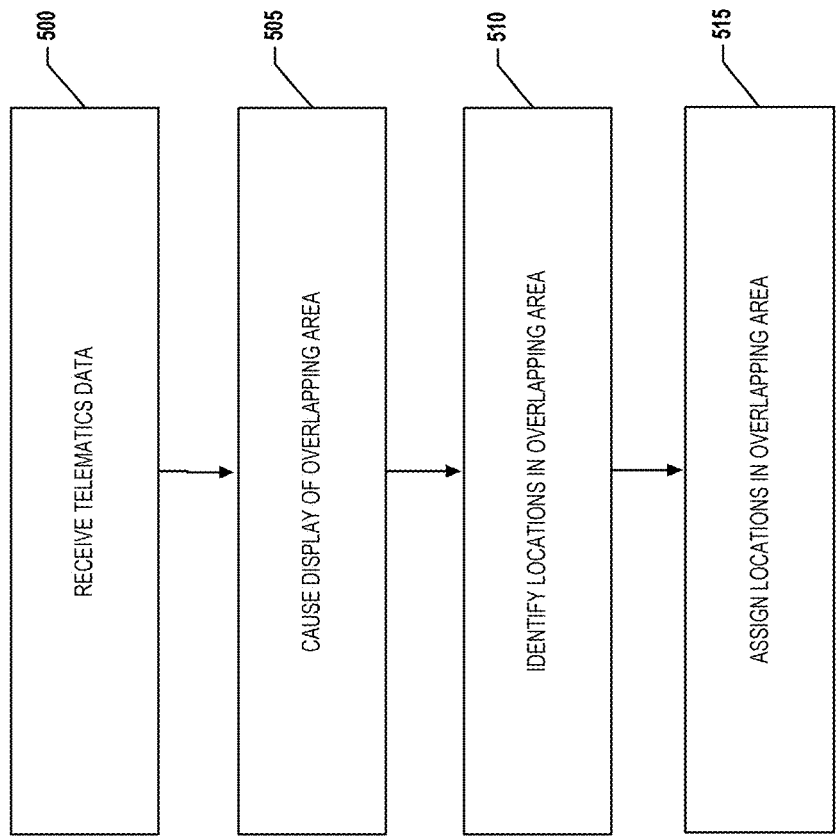
FIG. 5 is a flowchart illustrating operations and processes that can be used in accordance with various embodiments of the present invention.
Figure 6:
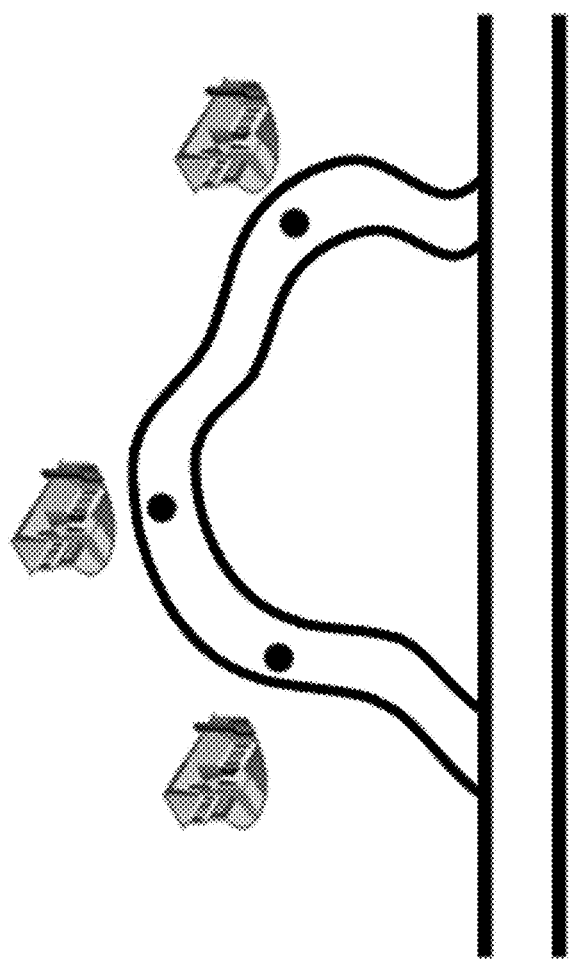
FIGS. 6-7 illustrate exemplary locations for which telematics data can be collected in accordance with various embodiments of the present invention.
Figure 7:
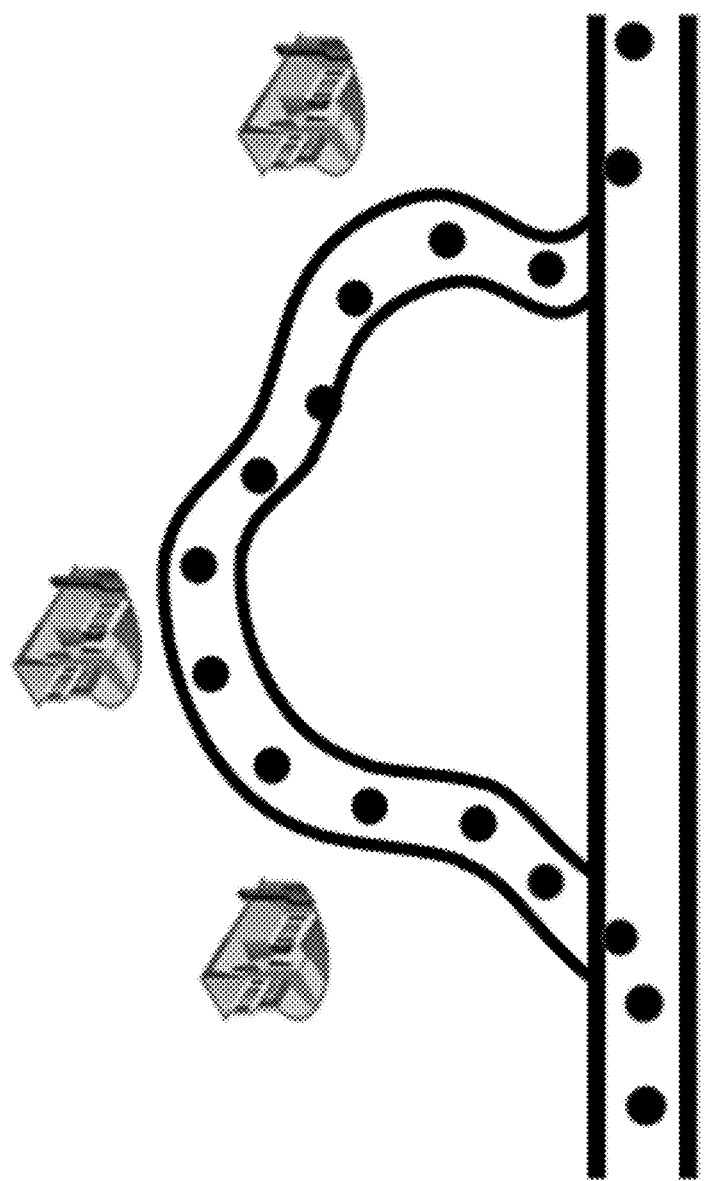
Figure 8:
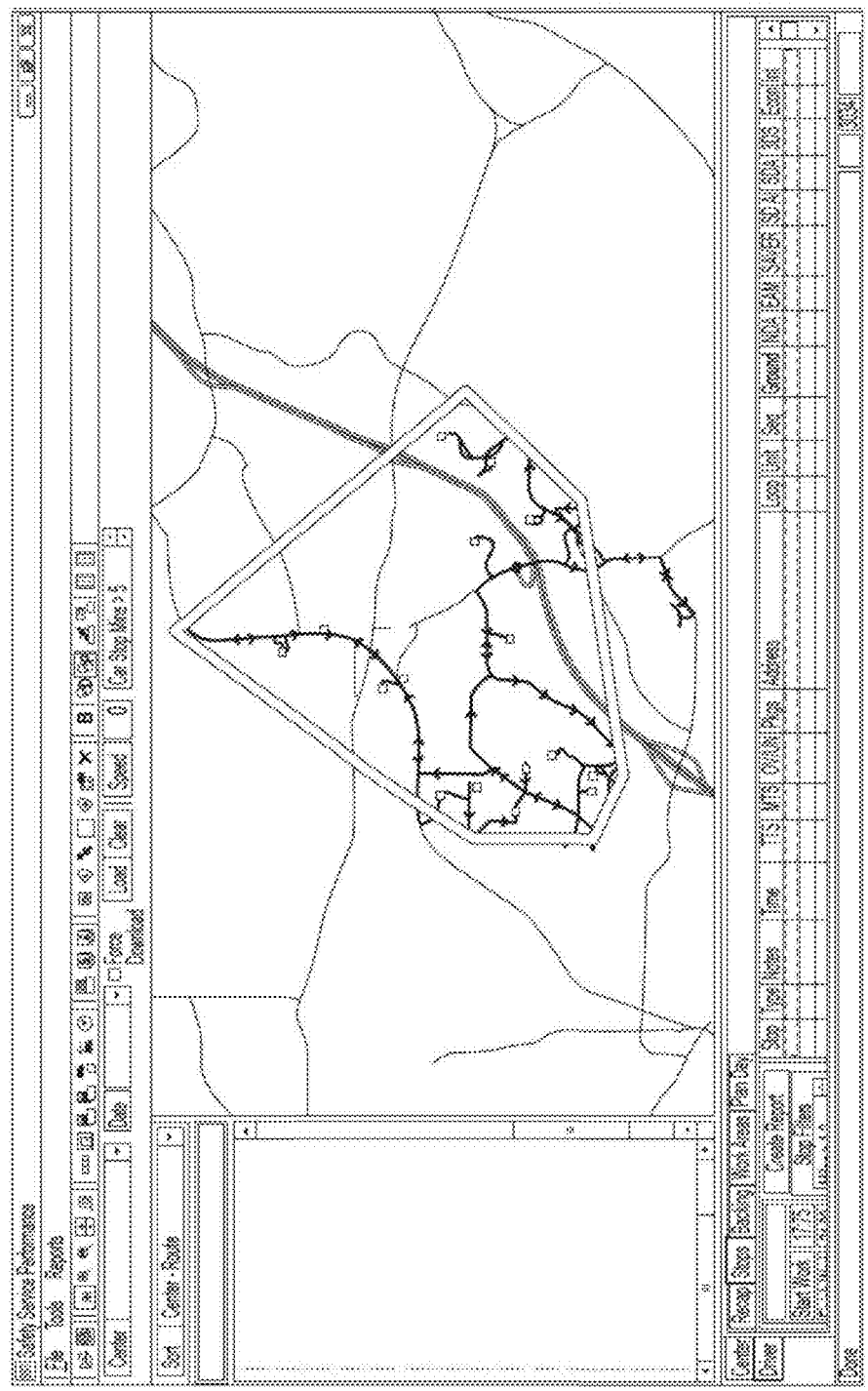
FIGS. 8-10 illustrate exemplary input and output that can be produced by various embodiments of the present invention.
Figure 9:
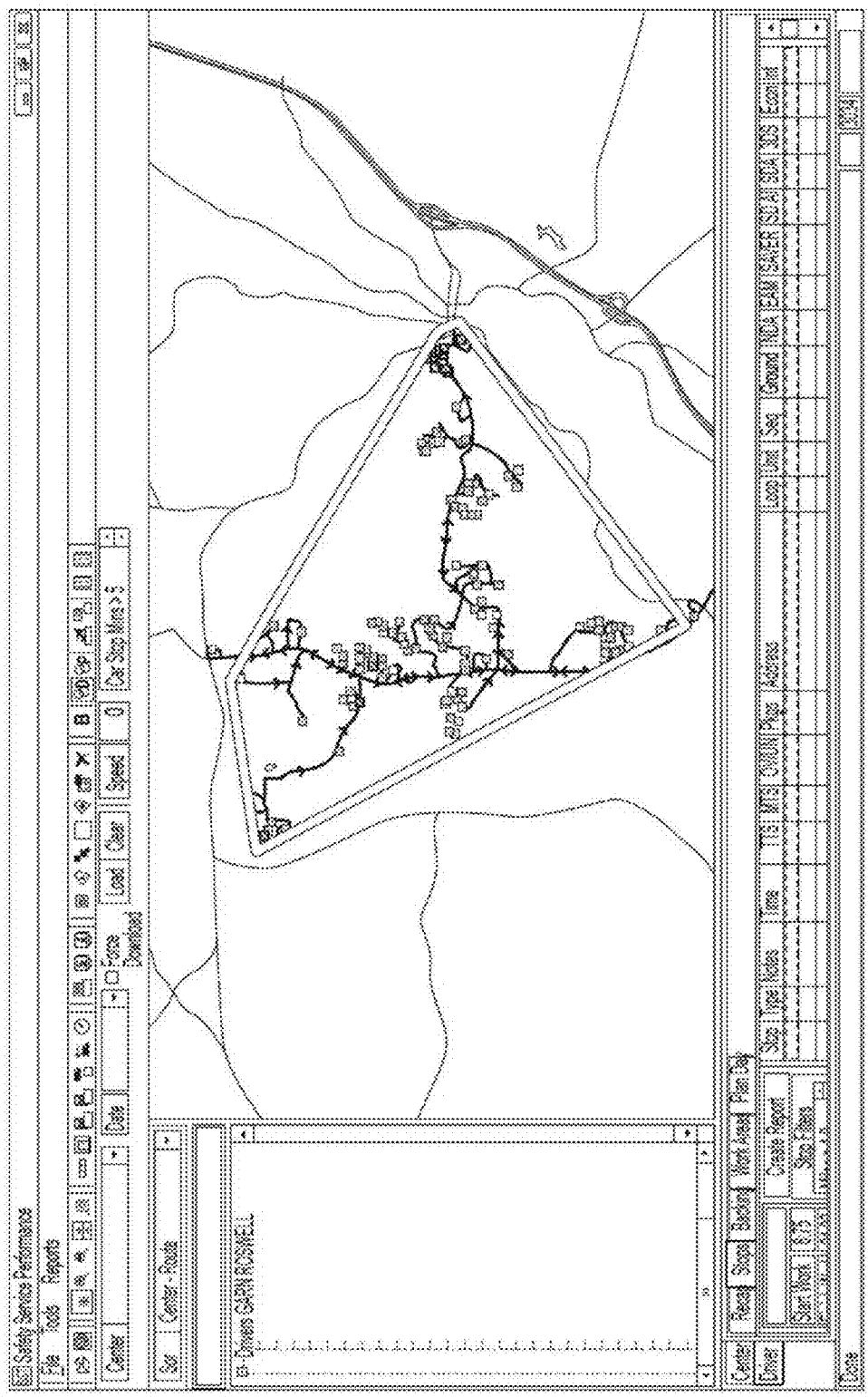
Figure 10:
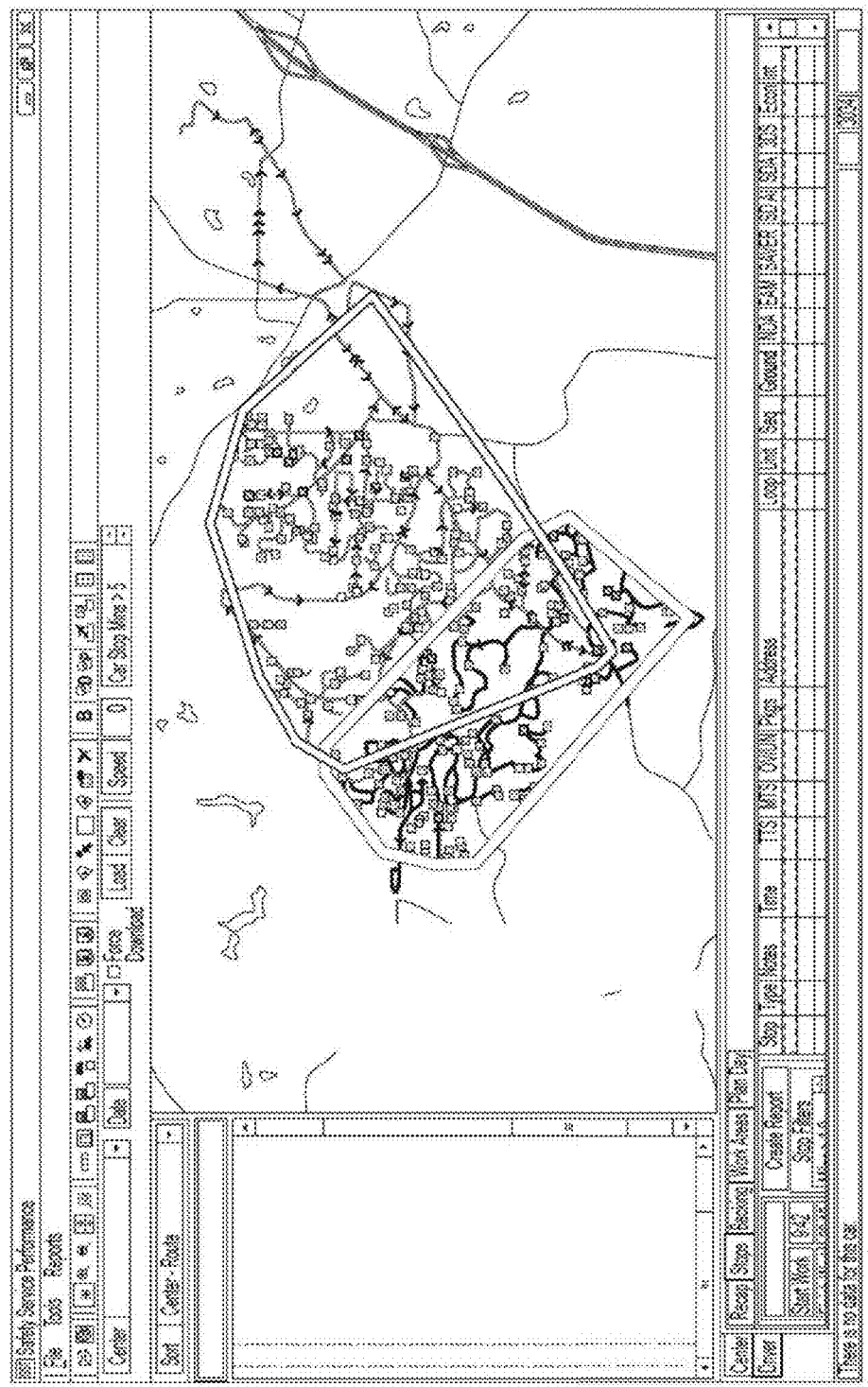

Reference will now be made to FIGS. 5-10. FIG. 5 illustrates operations and processes that can be performed for identifying overlapping areas. FIGS. 6-7 illustrate locations for which telematics data can be collected. FIGS. 8-10 illustrate exemplary input and output that can be produced by various embodiments of the present invention.

The following examples are described in the context of a fleet of delivery vehicles as the delivery vehicles traverse their respective delivery areas. As will be recognized, though, embodiments of the present invention are not limited to such examples.

a. Collection of Telematics Data

In one embodiment, a computing entity (e.g., the data collection device 130, portable device 105, and/or server 110) may be configured to collect/obtain/receive/store telematics data (e.g., latitude, longitude, altitude, geocode, course, position, time, and/or speed data) for various locations in a variety of ways. A location may be any point associated with an address or other any identifiable point. For instance, FIGS. 6-7 show exemplary locations for which telematics data can be collected/obtained/received/stored.

As indicated in Block 500 of FIG. 5, telematics data can be collected/obtained/received/stored as vehicles 100 (e.g., in a fleet) are operated in geographic areas, such as while delivery vehicles are traversing their respective delivery areas. For example, telematics data can be collected for a first vehicle (e.g., a first delivery vehicle) while operating within a first geographic area (e.g., an area traversed by the first vehicle) that corresponds to a first vehicle visit area (e.g., a delivery area assigned to the first vehicle). Similarly, telematics data can be collected for a second vehicle (e.g., a second delivery vehicle) while operating within a second geographic area (e.g., an area traversed by the second vehicle) that corresponds to a second vehicle visit area (e.g., a delivery area assigned to the second vehicle).

In one embodiment, regardless of how the telematics data is collected, the telematics data can be transmitted to and received for storage by the server 110 (e.g., the collection module 370). Thus, the server 110 can store telematics data associated with a number of vehicles 100, geographic areas, and vehicle visit areas. In various embodiments, this may allow the server 110 to process, analyze, and use the telematics data for various applications.

i. Triggered Collection

In one embodiment, as shown in FIG. 6, a computing entity (e.g., a data collection device 130, portable device 105, and/or server 110) can be configured to collect/obtain/receive/store telematics data in response to (e.g., after) one or more predefined triggers. Continuing with the above example, a computing entity can collect/obtain/receive/store telematics data for locations where items are delivered or picked up. In one embodiment, to do so, various predefined trigger events may be used. Such predefined trigger events may include, but are not limited to: (1) scan events; (2) electronic signature capture events; (3) input to a portable device 105 indicating that a driver has delivered an item (e.g., without capturing a signature); (4) input or event that indicates to a portable device 105 that the current stop is now complete; (5) input specifically instructing a portable device 105 to capture a sample of telematics data; (6) when a vehicle 100 is placed in the park position; and/or (7) the like. Thus, in response to (e.g., after) one or more predefined trigger events, a computing entity (e.g., the data collection device 130, portable device 105, and/or server 110) can collect/obtain/receive/store telematics data in association with the appropriate location.

ii. Regular, Periodic, and/or Continuous Collection

In one embodiment, a computing entity (e.g., the data collection device 130, portable device 105, and/or server 110) may be configured to regularly, periodically, and/or continuously collect/obtain/receive/store telematics data (e.g., latitude, longitude, altitude, geocode, course, and/or position data). For example, as shown in FIG. 7, a computing entity (e.g., the data collection device 130, portable device 105, and/or server 110) can be configured to regularly, periodically, and/or continuously collect telematics data as a vehicle 100 travels in a geographic area. For instance, FIG. 7 shows telematics data being collected/obtained/received/stored at certain time intervals (such as every 2, 5, 15 seconds) and/or certain distance intervals (such as every 1/10, 1/5, 1/2 mile).

In various embodiments, this approach may be beneficial since latitude, longitude, altitude, geocode, course, and/or position data (e.g. telematics data) may not always be available at any given time since, for example, the signal from a GPS satellite 115 could be temporarily blocked by a nearby obstruction. Thus, for instance, if telematics data is to be collected/obtained/received/stored at a time when latitude, longitude, altitude, geocode, course, and/or position data is not immediately obtainable, the last or next known (or a combination thereof) latitude, longitude, altitude, geocode, course, and/or position data can be used.

iii. Geofence-Based Collection

In one embodiment, a computing entity (e.g., the data collection device 130, portable device 105, and/or server 110) may use geofences to collect/obtain/receive/store telematics data. For example, a computing entity may be used to define geofences around geographic areas, such as around countries, regions, states, counties, cities, towns, interstates, roads, streets, avenues, toll roads, ways, exit and entrance ramps, pickup/delivery routes, bus routes, taxis routes, industrial parks, neighborhoods, parking lots, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic areas. The geographic areas, and therefore the geofences, may be any shape including, but not limited to, circles, squares, rectangles, irregular shapes, and/or the like. Moreover, the geofenced areas need not be the same shape or size. Accordingly, any combination of shapes and sizes may be used in accordance with embodiments of the present invention. Similarly, a geofence may overlap or reside wholly within another geofence. A geofence may be as large as an entire country, region, state, county, city, or town (or larger).

In one embodiment, once at least one geofence has been defined, the coordinates (or similar methods for defining the geofenced areas) may be stored in a database associated with, for example, a data collection device 130, portable device 105, and/or server 110. After the one or more geofenced areas (e.g., geofences) have been defined, the location of a vehicle 100 can be monitored. Generally, the location of the vehicle 100 can be monitored by any of a variety of computing entities, including the data collection device 130, portable device 105, and/or server 110. For example, as noted above, a vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (a data collection device 130, portable device 105, and/or server 110) can determine, for example, when the vehicle 100 enters and/or exits a defined geofence. Entering and/or exiting a geofenced area may cause a computing entity to collect/obtain/receive/store telematics data. Additionally or alternatively, a computing entity may regularly, periodically, and/or continuously collect/obtain/receive/store telematics data once inside and/or outside a particular geofenced area.

b. Overlapping Areas

In one embodiment, after collecting telematics data for one or more vehicles 100 (e.g., a first vehicle and a second vehicle), a computing entity (a data collection device 130, portable device 105, and/or server 110) can cause display of the geographic areas corresponding to the telematics data that was collected/obtained/received/stored. For example, as shown in FIGS. 8-10, the paths of the vehicles 100 in geographic areas can be displayed on a digital map (e.g., a graphical image). In one embodiment, as shown in FIGS. 8-9, the path traversed by a single vehicle 100 in a geographic area can be displayed. For example, as shown in FIG. 8, a computing entity can cause display of a first geographic area (e.g., an area traversed by a first vehicle) traversed by a first vehicle (e.g., a first delivery vehicle). In this example, the first geographic area may encompass a vehicle visit area (e.g., delivery area) assigned to the first vehicle 100. Similarly, as shown in FIG. 9, a computing entity can cause display of a second geographic area (e.g., an area traversed by a second vehicle) traversed by a second vehicle (e.g., a second delivery vehicle). In this example, the second geographic area may encompass a vehicle visit area (e.g., delivery area) assigned to the second vehicle 100. And finally, as shown in FIG. 10, a computing entity can simultaneously cause display of the first and second geographic areas and the paths traversed by the vehicles 100. As will be recognized, there is no limit to the number of geographic areas (and paths) that can be simultaneously be displayed.

In addition to causing display of geographic areas and paths traversed by vehicles, a computing entity (such as the server 110 via mapping module 360) can also cause display of specific locations associated with the geographic areas. The locations may be where deliveries or pickups occurred (e.g., where collection of telematics data was triggered) or be potential delivery or pick up locations. Similarly, the locations may be where a vehicle 100 traveled or stopped and/or where its engine was no longer running. As will be recognized, a variety of other approaches and techniques may also be used.

In embodiment, the telematics data displayed by the computing entity may correspond to telematics data collected over a certain time period. For example, the telematics data may have been collected over one or more months, one or more weeks, and/or one or more days. In various embodiments, it may be more useful to view a geographic area and paths traversed by a vehicle 100 over longer time periods since small time periods may not be reflective of the entire geographic area regularly traversed by a vehicle 100. Moreover, smaller periods of time might not reflect an entire vehicle visit area assigned to a driver or vehicle 100. For instance, a vehicle 100 may not visit all potential delivery and/or pick up locations in its delivery area each day or week.

In one embodiment, a computing entity (a data collection device 130, portable device 105, and/or server 110) can also cause display of an outline substantially around a geographic area traversed by (and/or vehicle visit area assigned to) a vehicle 100. For example, as shown in FIGS. 8-10, the geographic areas traversed by the vehicles 100 are displayed with a polygon substantially around the geographic areas (and/or vehicle visit areas). Causing display of the outline may be performed automatically by the computing entity or in response to user input. For example, a user (e.g., operating a computing entity) may use a mouse to graphically draw a polygon substantially around geographic areas traversed by (and/or vehicle visit areas assigned to) one or more vehicles 100.

In one embodiment, after simultaneously causing display of two or more geographic areas traversed by two or more vehicles respectively, a computing entity (a data collection device 130, portable device 105, and/or server 110) can display (and/or identify) of overlapping areas (Block 505 of FIG. 5), if any. For instance, FIG. 10 shows a first geographic area, a second geographic area, and an overlapping geographic area (e.g., the area overlapping the first and second geographic areas). In this example, the overlapping area is substantially outlined by the intersecting polygons. In one embodiment, it may be desirable to assign some or all of the locations in the overlapping area to a single vehicle 100. In various embodiments, this approach may allow the computing entity to identify locations in the overlapping area (Block 510), which may then be useful in minimizing distances traversed by vehicles 100. Thus, this may allow fleet operators to reduce fuel costs and increase driver efficiency.

In one embodiment, a computing entity (e.g., a server 110 via an assignment module 350) can automatically assign some or all of the locations (e.g., visited delivery or pickup locations and/or potential visit or pick up locations) substantially within the overlapping area to a single vehicle 100 (Block 515 of FIG. 5). In another embodiment, such an assignment may be in response to user input. For example, the locations within the overlapping area visited by the second vehicle (and/or assigned to the vehicle visit area associated with the second vehicle) can be assigned to the first vehicle (and/or assigned to the vehicle visit area associated with the first vehicle). Similarly, the locations within the overlapping area visited by the first vehicle (and/or assigned to the vehicle visit area associated with the first vehicle) can be assigned to the second vehicle (and/or assigned to the vehicle visit area associated with the second vehicle). In another embodiment, such assignments may be performed on a location-by-location basis in response to user input.

In one embodiment, to assign locations within an overlapping area, a computing entity may use, for example, the latitude and longitude coordinates associated with various points along the perimeter of the overlapping area. Using such coordinates, the computing entity can assign some or all locations within the overlapping area to a vehicle 100 or vehicle visit area. In one embodiment, this may include assigning all locations within an overlapping area, regardless of whether the locations were actually visited by a particular vehicle 100. Thus, for instance, if an overlapping area includes a street with only one house that was visited by a vehicle 100, all houses (e.g., street addresses) on the street can be assigned to a vehicle or vehicle visit area. As will be recognized, a variety of other approaches and techniques may also be used.

IV. Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for identifying an overlapping area, the method comprising:
   electronically receiving telematics data associated with a first vehicle, wherein the telematics data is collected while the first vehicle operates within a first geographic area;
   electronically receiving telematics data associated with a second vehicle, wherein the telematics data is collected while the second vehicle operates within a second geographic area;
   electronically identifying an overlapping area, wherein (1) the overlapping area is identified based at least in part from the (a) telematics data associated with the first vehicle and (b) the telematics data associated with the second vehicle, and (2) at least a portion of the overlapping area is within the first geographic area and the second geographic area; and
   assigning one or more detected locations in the overlapping area to at least one of the first vehicle or the second vehicle for travel to the detected locations.

2. The method of claim 1 further comprising simultaneously causing display of the first geographic area, the second geographic area, and the overlapping geographic area on a graphical image of a map.

3. The method of claim 2 further comprising simultaneously causing display of an outline of each of the first geographic area, the second geographic area, and the overlapping area on the graphical image of the map.

4. The method of claim 2 further comprising:
   electronically identifying one or more locations within the overlapping area and assigned to the second geographic area; and
   electronically assigning the one or more locations within the overlapping area and assigned to the second geographic area to the first geographic area.

5. The method of claim 2 further comprising:
   electronically identifying one or more locations within the overlapping area and assigned to the first geographic area; and
   electronically assigning the one or more locations within the overlapping area and assigned to the first geographic area to the second geographic area.

6. The method of claim 5 further comprising simultaneously causing display of an outline of each of the first geographic area, the second geographic area, and the overlapping area on the graphical image of the map.

7. The method of claim 6, wherein (1) each of the respective outlines is a polygon and (2) the first geographic area and the second geographic area are respectively defined by geofences.

8. The method of claim 1, wherein:
   the first geographic area comprises an area assigned to the first vehicle for delivery or pickup of one or more items; and
   the second geographic area comprises an area assigned to the second vehicle for delivery or pickup of one or more other items.

9. An apparatus comprising at least one processor and at least one memory including computer program code, the at least one memory and the computer program code configured to, with the processor, cause the apparatus to at least:
   receive telematics data associated with a first vehicle, wherein the telematics data is collected while the first vehicle operates within a first geographic area;
   receive telematics data associated with a second vehicle, wherein the telematics data is collected while the second vehicle operates within a second geographic area;
   identify an overlapping area, wherein (1) the overlapping area is identified based at least in part from the (a) telematics data associated with the first vehicle and (b) the telematics data associated with the second vehicle, and (2) at least a portion of the overlapping area is within the first geographic area and the second geographic area; and
   assign one or more detected locations in the overlapping area to at least one of the first vehicle or the second vehicle for travel to the detected locations.

10. The apparatus of claim 9, wherein the memory and computer program code are further configured to, with the processor, cause the apparatus to simultaneously cause display of the first geographic area, the second geographic area, and the overlapping geographic area on a graphical image of a map.

11. The apparatus of claim 10, wherein the memory and computer program code are further configured to, with the processor, cause the apparatus to simultaneously cause display of an outline of each of the first geographic area, the second geographic area, and the overlapping area on the graphical image of the map.

12. The apparatus of claim 10, wherein the memory and computer program code are further configured to, with the processor, cause the apparatus to:
   identify one or more locations within the overlapping area and assigned to the second geographic area; and
   assign the one or more locations within the overlapping area and assigned to the second geographic area to the first geographic area.

13. The apparatus of claim 10, wherein the memory and computer program code are further configured to, with the processor, cause the apparatus to:
   identify one or more locations within the overlapping area and assigned to the first geographic area; and
   assign the one or more locations within the overlapping area and assigned to the first geographic area to the second geographic area.

14. The apparatus of claim 13, wherein the memory and computer program code are further configured to, with the processor, cause the apparatus to simultaneously cause display of an outline of each of the first geographic area, the second geographic area, and the overlapping area on the graphical image of the map.

15. The apparatus of claim 14, wherein (1) each of the respective outlines is a polygon and (2) the first geographic area and the second geographic area are respectively defined by geofences.

16. The apparatus of claim 9, wherein:
   the first geographic area comprises an area assigned to the first vehicle for delivery or pickup of one or more items; and
   the second geographic area comprises an area assigned to the second vehicle for delivery or pickup of one or more other items.

17. A computer program product for identifying an overlapping area, the computer program product comprising at least one non-transitory computer-readable storage medium having computer-readable program code portions stored therein, the computer-readable program code portions comprising:
   an executable portion configured to receive telematics data associated with a first vehicle, wherein the telematics data is collected while the first vehicle operates within a first geographic area;
   an executable portion configured to receive telematics data associated with a second vehicle, wherein the telematics data is collected while the second vehicle operates within a second geographic area;
   an executable portion configured to identify an overlapping area, wherein (1) the overlapping area is identified based at least in part from the (a) telematics data associated with the first vehicle and (b) the telematics data associated with the second vehicle, and (2) at least a portion of the overlapping area is within the first geographic area and the second geographic area; and
   an executable portion configured to assign one or more detected locations in the overlapping area to at least one of the first vehicle or the second vehicle for travel to the detected locations.

18. The computer program product of claim 17 further comprising an executable portion configured to simultaneously cause display of the first geographic area, the second geographic area, and the overlapping geographic area on a graphical image of a map.

19. The computer program product of claim 18 further comprising an executable portion configured to simultaneously cause display of an outline of each of the first geographic area, the second geographic area, and the overlapping area on the graphical image of the map.

20. The computer program product of claim 18 further comprising:
   an executable portion configured to identify one or more locations within the overlapping area and assigned to the second geographic area; and
   an executable portion configured to assign the one or more locations within the overlapping area and assigned to the second geographic area to the first geographic area.

21. The computer program product of claim 18 further comprising:
   an executable portion configured to identify one or more locations within the overlapping area and assigned to the first geographic area; and
   an executable portion configured to assign the one or more locations within the overlapping area and assigned to the first geographic area to the second geographic area.

22. The computer program product of claim 21 further comprising an executable portion configured to simultaneously cause display of an outline of each of the first geographic area, the second geographic area, and the overlapping area on the graphical image of the map.

23. The computer program product of claim 22, wherein (1) each of the respective outlines is a polygon and (2) the first geographic area and the second geographic area are respectively defined by geofences.

24. The computer program product of claim 17, wherein:
   the first geographic area comprises an area assigned to the first vehicle for delivery or pickup of one or more items; and
   the second geographic area comprises an area assigned to the second vehicle for delivery or pickup of one or more other items.

* * * * *